(12) United States Patent
Tanaka et al.

(10) Patent No.: US 8,224,545 B2
(45) Date of Patent: Jul. 17, 2012

(54) BRAKE CONTROL APPARATUS AND BRAKE CONTROL METHOD

(75) Inventors: Yoshito Tanaka, Nishikamo-gun (JP); Hiroshi Nakaoka, Okazaki (JP); Masaki Nanahara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 574 days.

(21) Appl. No.: 12/526,273

(22) PCT Filed: Feb. 5, 2008

(86) PCT No.: PCT/IB2008/000239
§ 371 (c)(1),
(2), (4) Date: Aug. 7, 2009

(87) PCT Pub. No.: WO2008/096224
PCT Pub. Date: Aug. 14, 2008

(65) Prior Publication Data
US 2010/0114419 A1    May 6, 2010

(30) Foreign Application Priority Data
Feb. 7, 2007 (JP) ................................. 2007-028100

(51) Int. Cl.
G06F 19/00 (2011.01)
B60T 8/17 (2006.01)
(52) U.S. Cl. .......... 701/70; 701/78; 701/31.8; 701/34.4; 303/11; 303/122
(58) Field of Classification Search .............. 701/29.2, 701/30.5, 31.8, 76; 303/113.3; 477/196
See application file for complete search history.

(56) References Cited

U.S. PATENT DOCUMENTS

| 5,855,417 | A  | * | 1/1999  | Johnston et al. ................ 303/3 |
| 6,354,672 | B1 |   | 3/2002  | Nakamura et al. |
| 8,007,056 | B2 | * | 8/2011  | Ohkubo et al. .......... 303/122.05 |
| 2002/0149259 | A1 |  | 10/2002 | Otomo et al. |
| 2006/0066146 | A1 | * | 3/2006 | Otomo ........................ 303/151 |
| 2007/0159002 | A1 |  | 7/2007 | Otomo et al. |
| 2007/0176486 | A1 | * | 8/2007 | Nakamura ................ 303/115.1 |
| 2008/0084107 | A1 | * | 4/2008 | Yanai et al. ..................... 303/15 |
| 2009/0315391 | A1 | * | 12/2009 | Tanaka et al. ............. 303/113.5 |

FOREIGN PATENT DOCUMENTS

| EP | 1 090 823 | 4/2001 |
| EP | 1 251 052 | 10/2002 |
| EP | 1 642 795 | 4/2006 |
| JP | 2006 123889 | 5/2006 |
| JP | 2006 264675 | 10/2006 |

* cited by examiner

*Primary Examiner* — Thomas G. Black
*Assistant Examiner* — Lin B Olsen
(74) *Attorney, Agent, or Firm* — Oblon, Spivak, McClelland, Maier & Neustadt, L.L.P.

(57) ABSTRACT

A brake control apparatus (20) includes: a hydraulic pressure source (30) that regulates pressure of hydraulic fluid in accordance with a brake operation input (24,25); a wheel cylinder (23) that applies braking force to a wheel (22) in response to a supply of the hydraulic fluid to the wheel cylinder (23); a hydraulic pressure booster mechanism (31) that amplifies the brake operation input by using the hydraulic pressure source (30), and outputs the amplified brake operation input; a hydraulic fluid supply path (63) through which the hydraulic fluid is supplied from the hydraulic pressure source (30) to the wheel cylinder (23); and a controller (70) that shuts off (valve 66) a flow of the hydraulic fluid-through the hydraulic fluid supply path (63), if a malfunction due to hydraulic fluid leakage is detected in the hydraulic fluid supply path (63) during a brake control mode in which the hydraulic fluid is supplied to the wheel cylinder (23) through the hydraulic fluid supply path (63).

11 Claims, 6 Drawing Sheets

F I G . 1
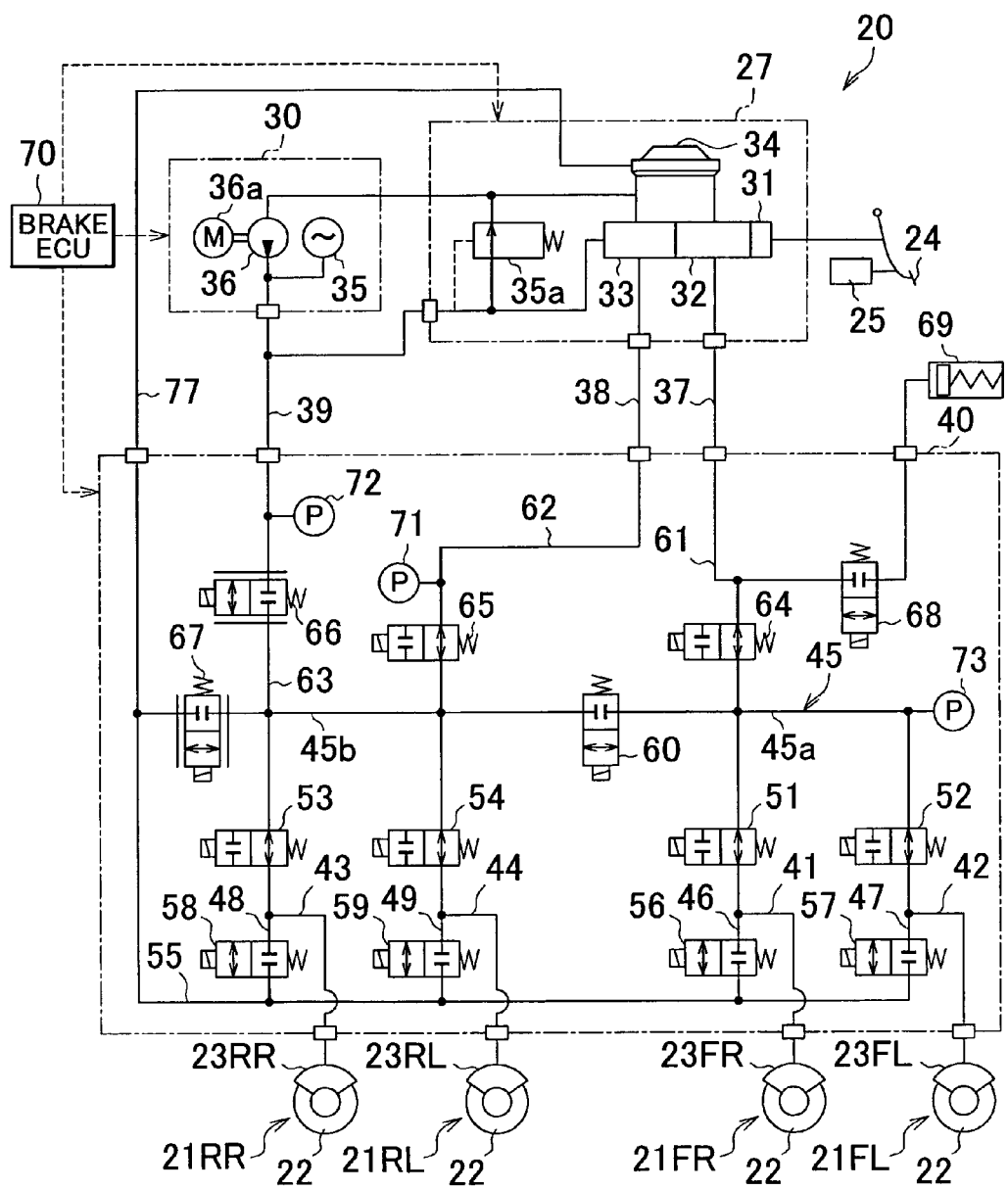

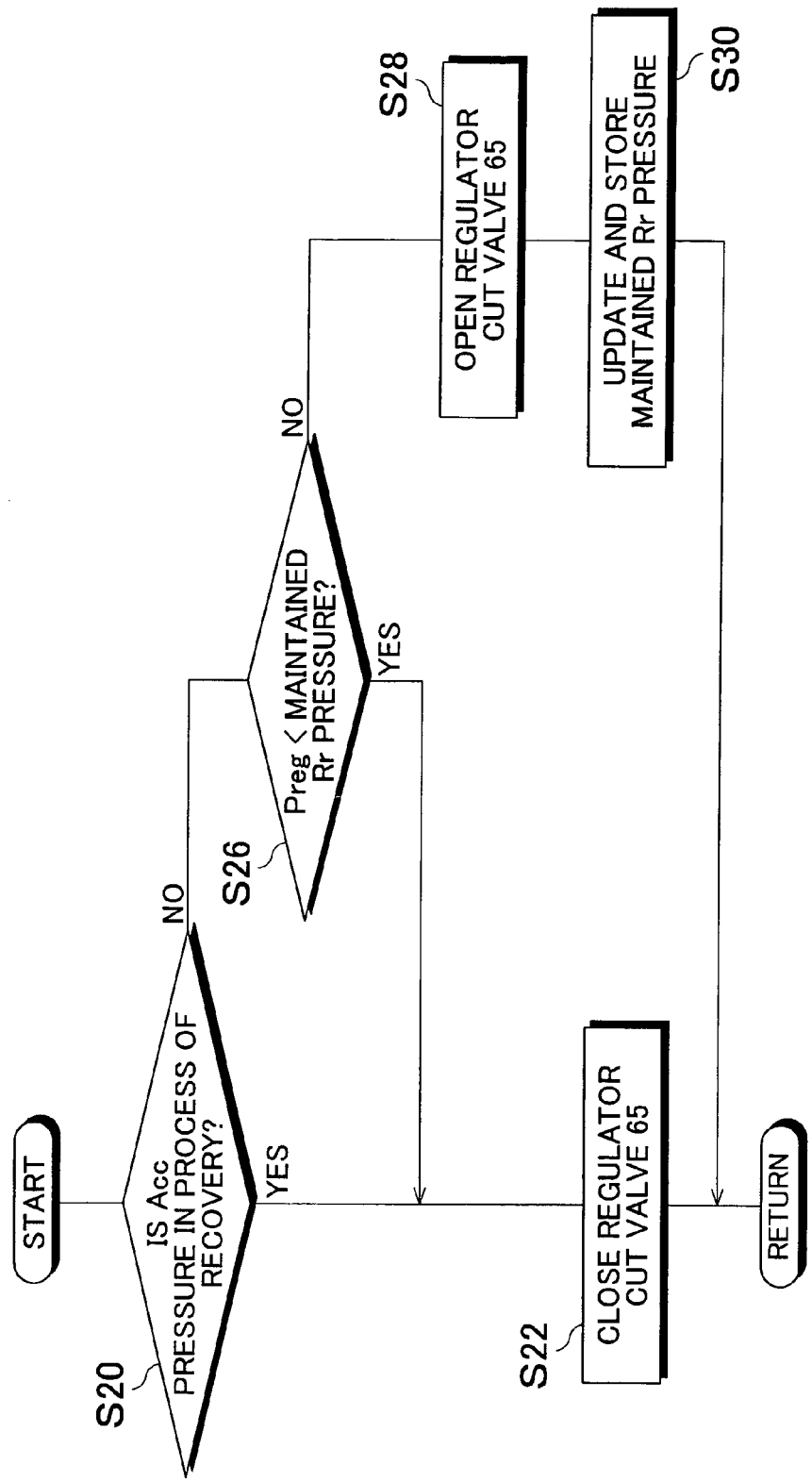

BRAKE CONTROL APPARATUS AND BRAKE CONTROL METHOD

BACKGROUND OF THE INVENTION

1. Field of the Invention

The invention relates to a brake control apparatus and method that controls braking forces applied to wheels of a vehicle.

2. Background of the Invention

Japanese Patent Application Publication No. 2006-123889 (JP-A-2006-123889) describes a hydraulic brake system including a hydraulic pressure booster, a master cylinder, a power hydraulic pressure source and multiple brake cylinders. In this hydraulic brake system, the multiple brake cylinders may be selectively communicated with the hydraulic pressure booster, the master cylinder and the power hydraulic pressure source using a simple circuit. This structure provides greater control over a hydraulic pressure. If the brake system is operating normally, hydraulic fluid is supplied from the power hydraulic pressure source to the brake cylinders. If a malfunction is detected, the brake system control mode is changed from the normal control mode to a different control mode. For example, the hydraulic brake system control mode may be changed to a control mode in which the hydraulic brake system is divided into two systems. In one of the two systems, the hydraulic fluid is supplied from the master cylinder to some wheel cylinders. In the other system, the hydraulic fluid is supplied from the hydraulic pressure booster to the remaining wheel cylinders.

However, if the detected malfunction is leakage of the hydraulic fluid, and the malfunction occurs in a fluid supply path through which the hydraulic fluid is supplied from the hydraulic pressure booster to the wheel cylinders, the hydraulic fluid supplied from the hydraulic pressure booster is wastefully consumed to the leakage. The original function of the hydraulic pressure booster is to amplify the brake operating force by several times or several tens of times and output the amplified the brake operating force to the master cylinder, thereby reducing the effort that a driver need to expend to operate the brake. However, if the hydraulic fluid from the hydraulic pressure booster, more specifically, the hydraulic fluid from a high-pressure accumulator which causes the hydraulic pressure booster to generate a hydraulic pressure, is wastefully consumed, the above-mentioned function of the hydraulic pressure booster is no longer attainable. In this case, the function of the hydraulic pressure booster deteriorates, and, in addition, the brake pedal undergoes so-called "kickback". As a result, the operability of the brake pedal or the brake feel changes.

SUMMARY OF THE INVENTION

The invention provides a brake control technology that suppresses a change in the braking feel, which is likely to be caused when a malfunction occurs.

A first aspect of the invention relates to A brake control apparatus, including multiple wheel cylinders that apply braking forces to respective wheels in accordance with hydraulic fluid pressures; a wheel cylinder pressure control system that controls the hydraulic fluid pressures in the multiple wheel cylinders by using a power hydraulic pressure source that pressurizes hydraulic fluid using power supplied to the power hydraulic pressure source; a manual hydraulic pressure source that includes a master cylinder which pressurizes hydraulic fluid stored in the master cylinder in accordance with a brake operation input, and a regulator which regulates hydraulic fluid pressure in accordance with hydraulic fluid pressure in the master cylinder by using the power hydraulic pressure source as a high-pressure source; a hydraulic pressure booster mechanism that amplifies the brake operation input by using the hydraulic fluid pressure in the regulator, and outputs the amplified brake operation input to the master cylinder; a hydraulic fluid supply path that connects the manual hydraulic pressure source to the multiple wheel cylinders, wherein, in a brake mode which is used as a backup control mode, the hydraulic fluid supply path is divided into a master cylinder-side system, through which the hydraulic fluid is supplied from the master cylinder to at least one of the wheel cylinders, and a regulator-side system, through which the hydraulic fluid is supplied from the regulator to the other of the wheel cylinders and a controller that terminates a control executed by the wheel cylinder pressure control system and changes a control mode to the brake mode used as the backup control mode when a malfunction is detected, and that shuts off a flow of the hydraulic fluid in the regulator-side system when it is determined that the malfunction is a malfunction due to hydraulic fluid leakage caused in the regulator-side system.

According to the first aspect of the invention described above, when a malfunction due to hydraulic fluid leakage is detected in the regulator-side system, the flow of the hydraulic fluid in the regulator-side system is shut off. Therefore, it is possible to prevent drainage of the hydraulic fluid from the power hydraulic pressure source. Accordingly, it is possible to maintain the proper operation of the booster mechanism that shares the hydraulic pressure source with the regulator-side system. As a result, it is possible to suppress a change in the brake feel, which is likely to be caused after a malfunction occurs.

In the first aspect of the invention described above, the controller may determine that the malfunction is a malfunction due to hydraulic fluid leakage caused in the regulator-side system, if hydraulic pressure in the power hydraulic pressure source continuously decreases even after the control mode is changed to the brake mode used as the backup control mode.

As described above, it is possible to relatively easily determine whether the malfunction is a malfunction due to hydraulic fluid leakage caused in the regulator-side system based on a change in the accumulator pressure.

In the first aspect of the invention described above, the controller may shut off the flow of the hydraulic fluid in the regulator-side system, if it is determined that a malfunction due to hydraulic fluid leakage has occurred in the regulator-side system and a malfunction due to hydraulic fluid leakage has not occurred in the master cylinder-side system.

The flow of the hydraulic fluid in the regulator system is shut off, after it is confirmed that a malfunction due to hydraulic fluid leakage has not occurred in the master cylinder-side system. Therefore, it is confirmed that a braking force can be generated in the master cylinder-side system. Accordingly, even if the flow of the hydraulic fluid in the regulator system is shut off, the braking force can be obtained using at least the master cylinder-side system. This makes it possible to suppress an abrupt change in the brake feel and obtain braking force.

In the first aspect of the invention described above, the controller may continue shutting off the flow of the hydraulic fluid in the regulator-side system, if a position, at which the malfunction due to hydraulic fluid leakage has occurred, is closer to the wheel cylinders than a position, at which the flow of the hydraulic fluid in the regulator system is shut off, is; and the controller may cancel shutting-off of the flow of the hydraulic fluid in the regulator-side system, if the position, at which the malfunction due to hydraulic fluid leakage has occurred, is closer to the regulator than the position, at which the flow of the hydraulic fluid in the regulator system is shut off, is.

In this manner, the flow of the hydraulic fluid in the regulator system is shut off, when drainage of the hydraulic fluid from the hydraulic pressure source is effectively prevented. Therefore, it is possible to reduce the frequency at which the flow of the hydraulic fluid in the regulator-side system is shut off in the brake mode, which is used as a backup control mode, thereby simplifying the control in the brake mode.

In the first aspect of the invention described above, if the position, at which the malfunction due to hydraulic fluid leakage has occurred, is closer to the regulator than the position, at which the flow of the hydraulic fluid in the regulator system is shut off, is, the controller may control the flow of the hydraulic fluid in the regulator-side system based on a magnitude relationship between the hydraulic fluid pressure in the wheel cylinders connected to the regulator-side system and the hydraulic pressure in the regulator.

In this manner, it is possible to control the flow of the hydraulic fluid in the regulator system in such a manner that the regulator pressure that is temporarily increased, for example, by further depression of the brake pedal by the driver is introduced into the wheel cylinders. Thus, it is possible to increase the hydraulic pressure maintained in the regulator system, and effectively use the increased hydraulic pressure to obtain a braking force.

A second aspect of the invention relates to a brake control apparatus, including: a hydraulic pressure source that regulates pressure of hydraulic fluid in accordance with a brake operation input; a wheel cylinder that applies braking force to a wheel in response to a supply of the hydraulic fluid to the wheel cylinder; a hydraulic pressure booster mechanism that amplifies the brake operation input by using the hydraulic pressure source, and outputs the amplified brake operation input; a hydraulic fluid supply path through which the hydraulic fluid is supplied from the hydraulic pressure source to the wheel cylinder; and a controller that shuts off a flow of the hydraulic fluid through the hydraulic fluid supply path, if a malfunction due to hydraulic fluid leakage is detected in the hydraulic fluid supply path during a brake control mode in which the hydraulic fluid is supplied to the wheel cylinder through the hydraulic fluid supply path.

According to the second aspect of the invention, when a malfunction due to hydraulic fluid leakage is detected in the hydraulic fluid supply path, the flow of the hydraulic fluid through the hydraulic fluid supply path is shut off. Therefore, it is possible to prevent drainage of the hydraulic fluid from the hydraulic pressure source. Because the hydraulic pressure source is shared by the wheel cylinders and the booster mechanism, it is possible to maintain the proper operation of the booster mechanism by shutting off the flow of the hydraulic fluid through the hydraulic fluid supply path. As a result, it is possible to suppress a change in the brake feel, which is likely to be caused after a malfunction due to hydraulic fluid leakage is detected.

A third aspect of the invention relates to a brake control method for controlling a brake control apparatus including a hydraulic pressure source that regulates pressure of hydraulic fluid in accordance with a brake operation input; a hydraulic pressure booster mechanism that amplifies the brake operation input by using the hydraulic pressure source, and outputs the amplified brake operation input; and a hydraulic fluid supply path through which the hydraulic fluid is supplied from the hydraulic pressure source to wheel cylinder. According to the brake control method, a flow of the hydraulic fluid through the hydraulic fluid supply path is shut off, if a malfunction due to hydraulic fluid leakage is detected in the hydraulic fluid supply path during a brake control mode in which the hydraulic fluid is supplied to the wheel cylinder through the hydraulic fluid supply path.

According to the aspects of the invention described above, it is possible to suppress a change in the brake feel, which is likely to be caused after a malfunction occurs.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein:

FIG. 1 is a system diagram showing a brake control apparatus according to an embodiment of the invention;

FIG. 7 is a flowchart showing the routine according to a second modified example of the embodiment of the invention.

DETAILED DESCRIPTION OF THE EMBODIMENT

Figure 2:
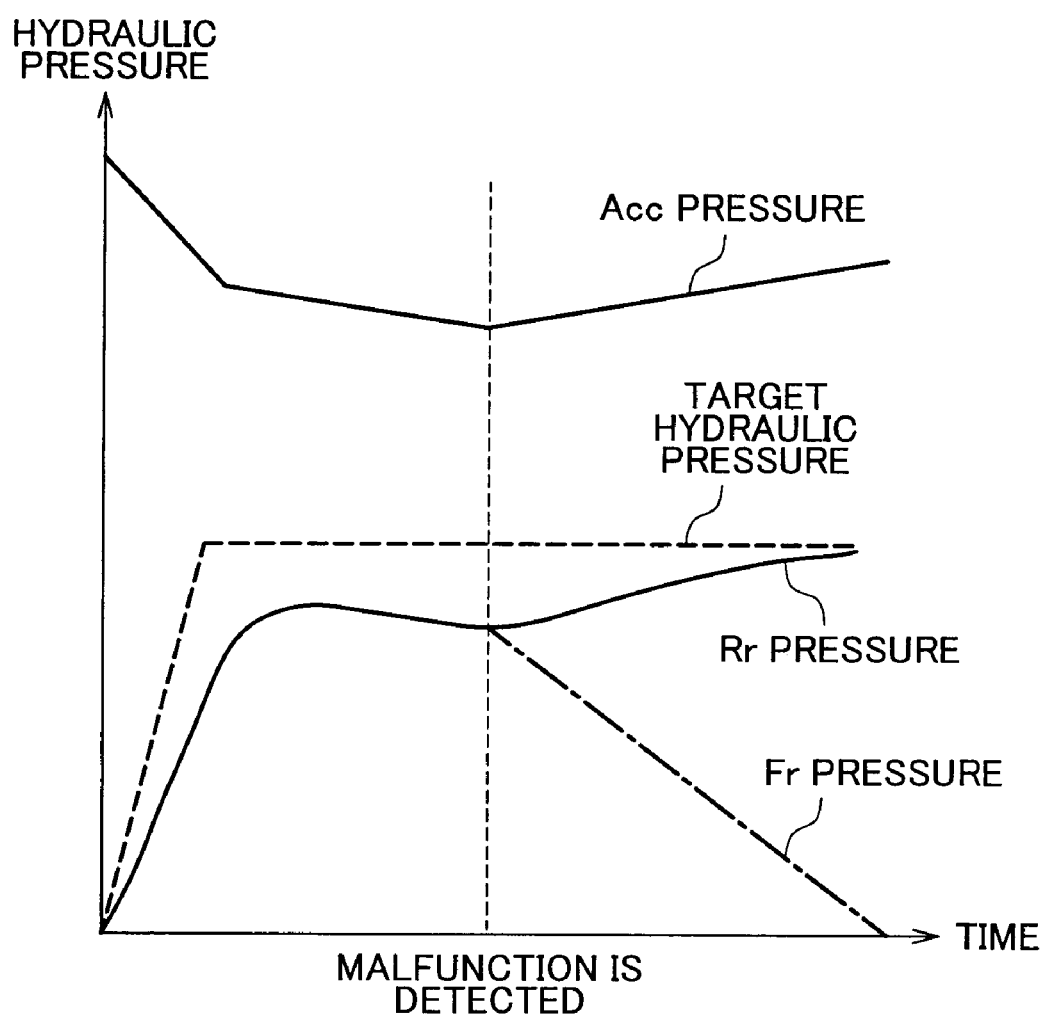
FIG. 2 is a graph illustrating a time-change in the hydraulic pressure, which is caused when a malfunction due to hydraulic fluid leakage occurs in a front-system.

Hereinafter, an embodiment of the invention will be described in detail with reference to the accompanying drawings.

FIG. 1 is a system diagram showing a brake control apparatus 20 according to an embodiment of the invention. The brake control apparatus 20 forms an electronically-controlled brake (ECB) system for a vehicle, and controls braking forces applied to four wheels of the vehicle. The brake control apparatus 20 according to the embodiment of the invention may be mounted in, for example, a hybrid vehicle that includes an electric motor and an internal combustion engine as drive power sources. In such hybrid vehicle, each of the regenerative braking control, in which the vehicle speed is reduced by converting some of kinetic energy of the vehicle into electrical energy, and the hydraulic braking control, in which the vehicle speed is reduced using the brake control apparatus 20, may be executed. In the vehicle in the embodiment of the invention, the cooperative braking control may be executed. In the cooperative braking control, the regenerative braking control and the hydraulic braking control are executed in combination to generate a required braking force.

As shown in FIG. 1, the brake control apparatus 20 includes disk brake units 21FR, 21FL, 21RR and 21RL provided to the respective wheels, a master cylinder unit 27, a power hydraulic pressure source 30 and a hydraulic pressure actuator 40.

The disk brake units 21FR, 21FL, 21RR and 21RL apply braking forces to the front-right wheel, the front-left wheel, the rear-right wheel and the rear-left wheel, respectively. The master cylinder unit 27, which functions as a manual hydraulic pressure source according to the embodiment of the invention, sends, to the disk brake units 21FR to 21RL, the brake fluid that is pressurized in accordance with the amount by which the driver has operated a brake pedal 24 that serves as a brake operation member. The power hydraulic pressure source 30 is able to send, to the disk brake units 21FR to 21RL, the brake fluid, which is the hydraulic fluid pressurized by a power supplied thereto, independently of the operation of the brake pedal 24 performed by the driver. The hydraulic pressure actuator 40 appropriately adjusts the hydraulic pressure of the brake fluid that is supplied from the power hydraulic pressure source 30 or the master cylinder unit 27, and then sends the brake fluid to the disk brake units 21FR to 21RL. With this structure, the braking forces that will be applied to the respective wheels by hydraulic braking are appropriately adjusted.

The disk brake units 21FR to 21RL, the master cylinder unit 27, the power hydraulic pressure source 30 and the hydraulic pressure actuator 40 will be described below in detail. The disk brake units 21FR, 21FL, 21RR and 21RL include brake disks 22 and wheel cylinders 23FR, 23FL, 23RR and 23RL housed in brake calipers, respectively. The wheel cylinders 23FR to 23RL are connected to the hydraulic pressure actuator 40 through respective fluid passages. Hereinafter, the wheel cylinders 23FR to 23RL will be collectively referred to as the "wheel cylinders 23" where appropriate.

In each of the disk brake units 21FR to 21RL, when the brake fluid from the hydraulic pressure actuator 40 is supplied to the wheel cylinder 23, a brake pad, which serves as a friction member, is pushed against the brake disk 22 that rotates together with the wheel. As a result, a braking force is applied to the wheel. In the embodiment of the invention, the disk brake units 21FR to 21RL are used. Alternatively, another type of braking force application mechanisms including wheel cylinders, for example, drum brakes may be used.

The master cylinder unit 27 used in the embodiment of the invention mainly includes a master cylinder with a hydraulic pressure booster. The master cylinder unit 27 includes a hydraulic pressure booster 31, a master cylinder 32, a regulator 33 and a reservoir 34. The hydraulic pressure booster 31 is connected to the brake pedal 24, and amplifies a pedal depressing force applied to the brake pedal 24 and then transfers the amplified force to the master cylinder 32. The brake fluid is supplied from the power hydraulic pressure source 30 to the hydraulic pressure booster 31 via the regulator 33, whereby the pedal depressing force is amplified. The master cylinder 32 generates a master cylinder pressure having a predetermined boost ratio with respect to the pedal depressing force.

The reservoir 34 that stores the brake fluid is provided on the master cylinder 32 and the regulator 33. The master cylinder 32 is communicated with the reservoir 34 when the brake pedal 24 is released. The regulator 33 is communicated with both the reservoir 34 and an accumulator 35 of the power hydraulic pressure source 30. The regulator 33 generates a hydraulic pressure that is substantially equal to the master cylinder pressure, using the reservoir 34 as a low pressure source, and the accumulator 35 as a high-pressure source. Hereinafter, the hydraulic pressure in the regulator 33 will be referred to as the "regulator pressure" where appropriate. The master cylinder pressure and the regulator pressure need not be exactly equal to each other. For example, the master cylinder unit 27 may be designed such that the regulator pressure is slightly higher than the master cylinder pressure.

The power hydraulic pressure source 30 includes the accumulator 35 and a pump 36. The accumulator 35 converts the pressure energy of the brake fluid boosted by the pump 36 into pressure energy of a filler gas such as nitrogen, for example, pressure energy of approximately 14 MPa to approximately 22 MPa, and stores the converted pressure energy. The pump 36 is provided with a motor 36a that is used as a drive power source. The inlet of the pump 36 is connected to the reservoir 34, and the outlet of the pump 36 is connected to the accumulator 35. The accumulator 35 is also connected to a relief valve 35a included in the master cylinder unit 27. When the pressure of the brake fluid in the accumulator 35 is increased to an excessively high pressure, for example, approximately 25 MPa, the relief valve 35a opens and the brake fluid having such excessively high pressure is returned to the reservoir 34.

As described above, the brake control apparatus 20 includes the master cylinder 32, the regulator 33 and the accumulator 35 that serve as the sources which supply brake fluid to the wheel cylinders 23. A master conduit 37 is connected to the master cylinder 32, a regulator conduit 38 is connected to the regulator 33, and an accumulator conduit 39 is connected to the accumulator 35. The master conduit 37, regulator conduit 38 and accumulator conduit 39 are connected to the hydraulic pressure actuator 40.

The hydraulic pressure actuator 40 includes an actuator block in which multiple fluid passages are formed, and multiple electromagnetically-controlled valves. The multiple fluid passages formed in the actuator block include individual fluid passages 41, 42, 43, and 44, and a main fluid passage 45. The individual fluid passages 41, 42, 43 and 44 branch off from the main fluid passage 45, and are connected to the wheel cylinders 23FR, 23FL, 23RR, and 23RL of the disk brake units 21FR, 21FL, 21RR, and 21RL, respectively. With this structure, each wheel cylinder 23 may communicate with the main fluid passage 45.

ABS holding valves 51, 52, 53 and 54 are provided at the middle portions of the individual fluid passages 41, 42, 43, and 44, respectively. Each of the ABS holding valves 51 to 54 includes an ON/OFF solenoid valve, and a spring. Each of the ABS holding valves 51 to 54 is a normally-open electromagnetically-controlled valve that is open when electricity is not supplied to the solenoid valve. When the ABS holding valves 51 to 54 are open, the brake fluid is allowed to flow from the main passage 45 to the wheel cylinders 23, or from the wheel cylinders 23 to the main passage 45. When the solenoid valves are supplied with electricity and the ABS holding valves 51 to 54 are closed, flows of the brake fluid through the individual fluid passages 41 to 44 via the ABS holding valves 51 to 54 are shut off.

The wheel cylinders 23 are connected to a reservoir fluid passage 55 through pressure-decreasing fluid passages 46, 47, 48 and 49 connected to the respective individual fluid passages 41, 42, 43 and 44. ABS pressure-decreasing valves 56, 57, 58 and 59 are provided at the middle portions of the pressure-decreasing fluid passages 46, 47, 48 and 49, respectively. Each of the ABS pressure-decreasing valves 56 to 59 includes an ON/OFF solenoid valve, and a spring. Each of the ABS pressure-decreasing valves 56 to 59 is a normally-closed electromagnetically-controlled valve that is closed when electricity is not supplied to the solenoid valve. When the ABS pressure-decreasing valves 56 to 59 are closed, flows of the brake fluid through the pressure-decreasing fluid passages 46 to 49 are shut off. When electricity is supplied to the solenoid valves, and the ABS pressure-decreasing valves 56 to 59 are open, the brake fluid is allowed to flow through the pressure-decreasing fluid passages 46 to 49. As a result, the brake fluid flows back from the wheel cylinders 23 to the reservoir 34 through the pressure-decreasing fluid passages 46 to 49 and the reservoir fluid passage 55. The reservoir fluid passage 55 is connected to the reservoir 34 of the master cylinder unit 27 through a reservoir conduit 77.

A partition valve 60 is provided at the middle portion of the main fluid passage 45. The partition valve 60 partitions the main fluid passage 45 into a first fluid passage 45*a* connected to the individual fluid passages 41 and 42, and a second fluid passage 45*b* connected to the individual fluid passages 43 and 44. The first fluid passage 45*a* is connected to, the wheel cylinders 23FR and 23FL of the front wheels via the individual fluid passages 41 and 42, respectively. The second fluid passage 45*b* is connected to the wheel cylinders 23RR and 23RL of the rear wheels via the individual fluid passages 43 and 44, respectively.

The partition valve 60 includes an ON/OFF solenoid valve, and a spring. The partition valve 60 is a normally-closed electromagnetically-controlled valve which is closed when electricity is not supplied to the solenoid valve. When the partition valve 60 is closed, a flow of the brake fluid between the first fluid passage 45*a* and the second fluid passage 45*b* is shut off. When electricity is supplied to the solenoid valve, and the partition valve 60 is open, the brake fluid is allowed to flow from the first fluid passage 45*a* to the second fluid passage 45*b*, or from the second fluid passage 45*b* to the first fluid passage 45*a*.

A master fluid passage 61 and a regulator fluid passage 62, which are communicated with the main fluid passage 45, are formed in the hydraulic pressure actuator 40. More specifically, the master fluid passage 61 is connected to the first fluid passage 45*a* of the main fluid passage 45, and the regulator fluid passage 62 is connected to the second fluid passage 45*b* of the main fluid passage 45. The master fluid passage 61 is connected to the master conduit 37 communicated with the master cylinder 32. The regulator fluid passage 62 is connected to the regulator conduit 38 communicated with the regulator 33.

A master cut valve 64 is provided at the middle portion of the master fluid passage 61. The master cut valve 64 is provided on the path through which the brake fluid is supplied from the master cylinder 32 to the wheel cylinders 23. The master cut valve 64 includes an ON/OFF solenoid valve, and a spring. The master cut valve 64 is a normally-open electromagnetically-controlled valve that is kept closed by the electromagnetic force generated by the solenoid valve upon reception of a prescribed magnitude of control current, and that is open when electricity is not supplied to the solenoid valve. When the master cut valve 64 is open, the brake fluid is allowed to flow from the master cylinder 32 to the first fluid passage 45*a* of the main fluid passage 45, or from the first fluid passage 45*a* to the master cylinder 32. When the prescribed magnitude of control current is supplied to the solenoid valve and the master cut valve 64 is closed, a flow of the brake fluid through the master fluid passage 61 via the master cut valve 64 is shut off.

A stroke simulator 69 is connected to the master fluid passage 61 via a simulator cut valve 68, at a position upstream of the master cut valve 64. That is, the simulator cut valve 68 is provided on the fluid passage that connects the master cylinder 32 and the stroke simulator 69 to each other. The simulator cut valve 68 includes an ON/OFF solenoid valve, and a spring. The simulator cut valve 68 valve is a normally-closed electromagnetically-controlled valve that is kept open by the electromagnetic force generated by the solenoid valve upon reception of a prescribed magnitude of control current, and that is closed when electricity is not supplied to the solenoid valve. When the simulator cut valve 68 is closed, a flow of the brake fluid between the master passage 61 and the stroke simulator 69 is shut off. When electricity is supplied to the solenoid valve, and the simulator cut valve 68 is open, the brake fluid is allowed to flow from the master cylinder 32 to the stroke simulator 69, or from the stroke simulator 69 to the master cylinder 32.

The stroke simulator 69 includes multiple pistons and springs. The stroke simulator 69 generates a reaction force corresponding to the pedal depressing force applied to the brake pedal 24 by the driver, when the simulator cut valve 68 is open. To improve the brake operating feel felt by the driver, preferably, a stroke simulator having multi-stage spring characteristics is employed as the stroke simulator 69.

A regulator cut valve 65 is provided at the middle portion of the regulator fluid passage 62. The regulator cut valve 65 is provided on the path through which the brake fluid is supplied from the regulator 33 to the wheel cylinders 23. The regulator cut valve 65 also includes an ON/OFF solenoid valve, and a spring. The regulator cut valve 65 is a normally-open electromagnetically-controlled valve that is kept closed by the electromagnetic force generated by the solenoid valve upon reception of a prescribed magnitude of control current, and that is open when electricity is not supplied to the solenoid valve. When the regulator cut valve 65 is open, the brake fluid is allowed to flow from the regulator 33 to the second fluid passage 45*b* of the main fluid passage 45, or from the second fluid passage 45*b* to the regulator 33. When electricity is supplied to the solenoid valve and the regulator cut valve 65 is closed, a flow of the brake fluid through the regulator fluid passage 62 is shut off.

In addition to the master fluid passage 61 and the regulator fluid passage 62, an accumulator fluid passage 63 is also formed in the hydraulic pressure actuator 40. One end of the accumulator fluid passage 63 is connected to the second fluid passage 45*b* of the main fluid passage 45, and the other end thereof is connected to the accumulator conduit 39 that is communicated with the accumulator 35.

A pressure-increasing linear control valve 66 is provided at the middle portion of the accumulator fluid passage 63. The accumulator fluid passage 63 and the second fluid passage 45*b* of the main fluid passage 45 are connected to the reservoir fluid passage 55 via a pressure-decreasing linear control valve 67. Each of the pressure-increasing linear control valve 66 and the pressure-decreasing linear control valve 67 includes a solenoid valve and a spring. Each of the pressure-increasing linear control valve 66 and the pressure-decreasing linear control valve 67 is a normally-closed electromagnetically-controlled valve that is closed when electricity is not supplied to the solenoid valve. The opening amount of each of the pressure-increasing linear control valve 66 and the pressure-decreasing linear control valve 67 is adjusted in proportion to the magnitude of electric current supplied to the solenoid valve.

The pressure-increasing linear control valve 66 is a pressure-increasing control valve shared by all the multiple wheel cylinders 23 corresponding to the respective wheels. Similarly, the pressure-decreasing linear valve 67 is a pressure-decreasing control valve shared by all the multiple wheel cylinders 23. In the embodiment of the invention, the pressure-increasing linear control valve 66 and the pressure-decreasing linear control valve 67 serve as paired control valves that control the manner in which the hydraulic fluid from the power hydraulic pressure source 30 is supplied to the wheel cylinders 23. The cost performance is better when a linear control valve, for example, the pressure-increasing control valve 66 is shared by all the wheel cylinders 23 than when the wheel cylinder 23 are provided with respective linear control valves.

The pressure difference between the inlet and the outlet of the pressure-increasing linear control valve 66 corresponds to the pressure difference between the brake fluid in the accumulator 35 and the brake fluid in the main fluid passage 45. The pressure difference between the inlet and the outlet of the pressure-decreasing linear control valve 67 corresponds to the pressure difference between the brake fluid in the main fluid passage 45 and the brake fluid in the reservoir 34. When the electromagnetic driving force that corresponds to the electricity supplied to the linear solenoid valve of each of the pressure-increasing linear control valve 66 and the pressure-decreasing linear control valve 67 is denoted by F1, the biasing force of the spring is denoted by F2, and the differential pressure acting force that corresponds to the pressure difference between the inlet and the outlet of each of the pressure-increasing linear control valve 66 and the pressure-decreasing linear control valve 67 is denoted by F3, the relationship among F1, F2 and F3 is expressed by the equation, F1+F3=F2. Accordingly, the pressure difference between the inlet and the outlet of each of the pressure-increasing linear control valve 66 and the pressure-decreasing linear control valve 67 is controlled by continuously controlling of the electricity supplied to the linear solenoid valve of each of the pressure-increasing linear control valve 66 and the pressure-decreasing linear control valve 67.

In the brake control apparatus 20, the power hydraulic pressure source 30 and the hydraulic pressure actuator 40 are controlled by a brake ECU 70 that functions as a control unit according to the invention. The brake ECU 70 is formed of a microprocessor including a CPU. The brake ECU 70 includes ROM that stores various programs, RAM that temporarily stores data, an input port, an output port, a communication port, etc. in addition to the CPU. The brake ECU 70 is able to communicate with, for example, a hybrid ECU (not shown), which is at a higher-level hierarchy. The brake ECU 70 controls the pump 36 of the power hydraulic pressure source 30 and the electromagnetically-controlled valves 51 to 54, 56 to 59, 60, and 64 to 68 included in the hydraulic pressure actuator 40, based on control signals from the hybrid ECU and signals from various sensors.

A regulator pressure sensor 71, an accumulator pressure sensor 72 and a control pressure sensor 73 are connected to the brake ECU 70. The regulator pressure sensor 71 detects the pressure of the brake fluid in the regulator fluid passage 62, i.e., the regulator pressure, at a position upstream of the regulator cut valve 65, and transmits a signal indicating the detected regulator pressure to the brake ECU 70. The accumulator pressure sensor 72 detects the pressure of the brake fluid in the accumulator fluid passage 63, i.e., the accumulator pressure, at a position upstream of the pressure-increasing linear control valve 66, and transmits a signal indicating the detected accumulator pressure to the brake ECU 70. The control pressure sensor 73 detects the pressure of the brake fluid in the first fluid passage 45a of the main fluid passage 45, and transmits a signal indicating the detected pressure to the brake ECU 70. The signals indicating the pressures detected by the pressure sensors 71 to 73 are transmitted to the brake ECU 70 at predetermined time intervals. Each time the brake ECU 70 receives the signal, the information indicated by the signal is stored in a certain memory region of the brake ECU 70.

When the partition valve 60 is open and therefore the first fluid passage 45a and second fluid passage 45b of the main fluid passage 45 are communicated with each other, the output value from the control pressure sensor 73 indicates the hydraulic pressure on the lower-pressure side of the pressure-increasing linear control valve 66 and, at the same time, indicates the hydraulic pressure on the higher-pressure side of the pressure-decreasing linear control valve 67. Therefore, the output value from the control pressure sensor 73 may be used to control the pressure-increasing linear control valve 66 and the pressure-decreasing linear control valve 67. When the pressure-increasing linear control valve 66 and the pressure-decreasing linear control valve 67 are closed and the master cut valve 64 is open, the output value from the control pressure sensor 73 indicates the master cylinder pressure. When the partition valve 60 is open to provide communication between the first fluid passage 45a and the second fluid passage 45b of the main fluid passage 45, the ABS holding valves 51 to 54 are open, and the ABS pressure-decreasing valves 56 to 59 are closed, the output value from the control pressure sensor 73 indicates the hydraulic pressure applied to each wheel cylinder 23, i.e., the wheel cylinder pressure.

In addition to the sensors described above, a stroke sensor 25 provided to the brake pedal 24 is connected to the brake ECU 70. The stroke sensor 25 detects the pedal stroke when the brake pedal 24 is depressed, and transmits a signal indicating the detected pedal stroke to the brake ECU 70. The signal indicating the pedal stroke detected by the stroke sensor 25 is transmitted to the brake ECU 70 at predetermined time intervals. Each time the brake ECU 70 receives the signal, the information indicated by the signal is stored in a certain memory region of the brake ECU 70. Brake operation state detection means other than the stroke sensor 25 may be provided in addition to or instead of the stroke sensor 25, and may be connected to the brake ECU 70. The brake operation state detection means may be, for example, a pedal depressing force sensor that detects the depressing force applied to the brake pedal 24, or a brake switch that detects depression of the brake pedal 24.

The brake control apparatus 20 configured as described above is able to execute the cooperative braking control. The brake control apparatus 20 starts the braking operation upon reception of a braking command. A braking command is issued when a braking force should be applied to the vehicle, for example, when the driver depresses the brake pedal 24. The brake ECU 70 calculates the required braking force upon reception of a braking command. The brake ECU 70 calculates the required hydraulic braking force, that is, the braking force that should be generated by the brake control apparatus 20, by subtracting the regenerative braking force from the required braking force. In this case, a signal indicating the regenerative braking force is transmitted from the hybrid ECU to the brake control apparatus 20. The brake ECU 70 calculates target hydraulic pressures for the wheel cylinders 23FR to 23RL based on the required hydraulic braking force derived through the calculation. The brake ECU 70 sets the values of the control currents supplied to the pressure-increasing linear control valve 66 and the pressure-decreasing linear control valve 67 based on a feedback control law such that the wheel cylinder pressures match the target hydraulic pressures.

As a result, in the brake control apparatus 20, the brake fluid is supplied from the power hydraulic pressure source 30 to the wheel cylinder 23 via the pressure-increasing linear control valve 66, and the braking forces are applied to the wheels. In addition, the brake fluid is discharged, as required, from the wheel cylinders 23 via the pressure-decreasing linear control valve 67, to adjust the braking forces applied to the wheels. The power hydraulic pressure source 30, the pressure-increasing linear control valve 66, the pressure-decreasing linear control valve 67, etc. constitute a wheel cylinder pressure control system according to the invention. With the wheel cylinder pressure control system, so-called brake-by-wire control is executed over a braking force. The wheel cylinder pressure control system is provided in parallel to the path through which the brake fluid is supplied from the master cylinder unit 27 to the wheel cylinders 23.

When the braking force is controlled by the wheel cylinder pressure control system, the brake ECU 70 closes the regulator cut valve 65 so that the brake fluid delivered from the regulator 33 is not supplied to the wheel cylinders 23. In addition, the brake ECU 70 closes the master cut valve 64 and opens the simulator cut valve 68. Accordingly, the brake fluid, which is delivered from the master cylinder 32 in response to the operation of the brake pedal 24 performed by the driver, is supplied to the stroke simulator 69 without being supplied to the wheel cylinders 23. During the cooperative braking control, a pressure difference, which corresponds to the magnitude of regenerative braking force, is caused between upstream side and the downstream of each of the regulator cut valve 65 and the master cut valve 64.

The brake control apparatus 20 according to the embodiment of the invention is able to control the braking force using the wheel cylinder pressure control system, even when the required braking force is obtained only from the hydraulic braking force without using the regenerative braking force. Hereinafter, the control mode in which the braking force is controlled by the wheel cylinder pressure control system will be referred to as the "linear control mode" where appropriate, regardless of whether the cooperative braking control is executed. This control mode is sometimes referred to as the "brake-by-wire control."

When the required braking force is obtained only from the hydraulic braking force, the brake ECU 70 executes the control using the regulator pressure or the master cylinder pressure as the target wheel cylinder pressure. In this case, it is not necessary to use the wheel cylinder pressure control system to supply the brake fluid to the wheel cylinders 23. This is because the required braking force can be generated if the master cylinder pressure or a regulator pressure, which is increased in accordance with the operation of the brake pedal 24 performed by the driver, is supplied to the wheel cylinders 23.

Accordingly, in the brake control apparatus 20, the brake fluid may be supplied from the regulator 33 to the wheel cylinders 23, when the regenerative braking force is not used, for example, when the vehicle is stopped. Hereinafter, the control mode in which the brake fluid is supplied from the regulator 33 to the wheel cylinders 23 will be referred to as the "regulator mode". The brake ECU 70 may change the control mode from the linear control mode to the regulator control mode and the braking force may be generated in the regulator mode while the vehicle is stopped. If the control mode is changed to the regulator mode at the same time that the vehicle is stopped, the control mode is changed by a relatively simple control. More practically, the brake ECU 70 may change the control mode from the linear control mode to the regulator mode, when the regenerative braking control is terminated because the vehicle speed has been decreased sufficiently by the braking operation.

In the regulator mode, the brake ECU 70 opens the regulator cut valve 65 and the partition valve 60, and closes the master cut valve 64. The controls over the pressure-increasing linear control valve 66 and the pressure-decreasing linear control valve 67 are terminated and thus these valves are closed. The simulator cut valve 68 is opened. As a result, the brake fluid is supplied from the regulator 33 to the wheel cylinders 23, and the braking forces are applied to the wheels by the regulator pressure. Because the power hydraulic pressure source 30, which serves as the high-pressure source, is connected to the regulator 33, the regulator is able to generate a braking force using the pressure accumulated in the power hydraulic pressure source 30.

In the regulator mode described above, the brake ECU 70 shuts off the supply of control currents to the pressure-increasing linear control valve 66 and the pressure-decreasing linear control valve 67 to close these valves. As a result, these valves are brought into the non-operating state. Therefore, the pressure-increasing linear control valve 66 and the pressure-decreasing linear control valve 67 operate less frequently. This prolongs the service lives of the pressure-increasing linear control valve 66 and the pressure-decreasing linear control valve 67. That is, the durability of each of the pressure-increasing linear control valve 66 and the pressure-decreasing linear control valve 67 is enhanced.

During the control in the linear control mode, the wheel cylinder pressure may deviate from a target pressure due to occurrence of a malfunction caused by, for example, leakage of the hydraulic fluid, which occurs somewhere in the system. The brake ECU 70 periodically determines whether there is an anomaly in response of the wheel cylinder pressure to the control based on, for example, the value detected by the control pressure sensor 73. The brake ECU 70 determines that there is an anomaly in response of the wheel cylinder pressure to the control, for example, when the deviation of the detected wheel cylinder pressure from the target hydraulic pressure exceeds a reference value. If it is determined that there is an anomaly in response of the wheel cylinder pressure to the control, the brake ECU 70 terminates the linear control mode, and changes the control mode to the manual brake mode. In the regulator mode as well, if an malfunction is detected, the brake ECU 70 changes the control mode to the manual brake mode. In the manual brake mode, the depressing force applied to the brake pedal 24 by the driver is converted to a hydraulic pressure and the hydraulic pressure is mechanically transferred to the wheel cylinders 23, whereby a braking force is applied to the wheels. From the viewpoint of failsafe properties, the manual brake mode used as a backup control mode for the linear control mode.

The brake ECU 70 selects one control mode, which is used as the manual brake mode, from among multiple control modes by making the hydraulic pressure source and the path, through which the hydraulic fluid is supplied from the hydraulic pressure source to the wheel cylinders 23, different among the wheels. In the embodiment of the invention, the case where the control mode is changed to the hydro-booster mode will be described, as an example. In the hydro-booster mode, the brake ECU 70 stops supplying the control currents to all of the electromagnetically-controlled valves. Therefore, the master cut valve 64 and the regulator cut valve 65, both of which are normally-open valves, are opened, whereas the partition valve 60 and the simulator cut valve 68, both of which are normally-closed valves, are closed. Further, the controls over the pressure-increasing linear control valve 66 and the pressure-decreasing linear control valve 67 are stopped, and these valve 66 and 67 are closed.

As a result, the path, through which the brake fluid is supplied from the hydraulic pressure source to the wheel cylinders 23, is divided into a master cylinder-side system and a regulator-side system. The master cylinder pressure is transferred to the wheel cylinders 23FR and 23FL of the front wheels, whereas the regulator pressure is transferred to the wheel cylinders 23RR and 23RL of the rear wheels. The destination of the hydraulic fluid discharged from the master cylinder 32 is switched from the stroke simulator 69 to the wheel cylinders 23FR and 23FL of the front wheels. Because the hydraulic pressure booster 31 is a mechanism that mechanically amplifies the pedal depressing force, the hydraulic pressure booster 31 continues operating even after the control mode is changed to the hydro-booster mode and accordingly supply of the control currents to the respective electromagnetically-controlled valves is stopped. In the hydro-booster mode, excellent failsafe properties are obtained because a braking force can be generated by using the hydraulic pressure booster even if supply of electricity to the electromagnetically-controlled valves is shut off due to an malfunction in the control system.

For convenience of description, hereinafter, the master cylinder-side system that is formed in the hydro-booster mode will be referred to as a "master cylinder-side system", and the regulator-side system that is formed also in the hydro-booster mode will be referred to as a "regulator-side system", where appropriate. According to the embodiment of the invention, in the hydro-booster mode, the hydraulic fluid is supplied to wheel cylinders of the front wheels by the master cylinder-side system, and the hydraulic fluid is supplied to the wheel cylinders of the rear wheels by the regulator-side system. Therefore, the master cylinder-side system and the regulator-side system will be occasionally referred to as a front-system and a rear-system, respectively. It is not absolutely necessary that the hydraulic fluid be supplied to wheel cylinders of the front wheels by the master cylinder-side system and the hydraulic fluid be supplied to wheel cylinders of the rear wheels by the regulator-side system in the hydro-booster mode. A so-called X-piped brake control apparatus may be employed. In the X-piped brake control apparatus, the right and left front wheels are connected to the different systems and the right and left rear wheels are connected to the different systems, for example, the master cylinder-side system supplies the hydraulic fluid to the front-right wheel and the rear-left wheel, and the regulator-side system supplies the hydraulic fluid to the front-left wheel and the rear-right wheel.

Figure 3:
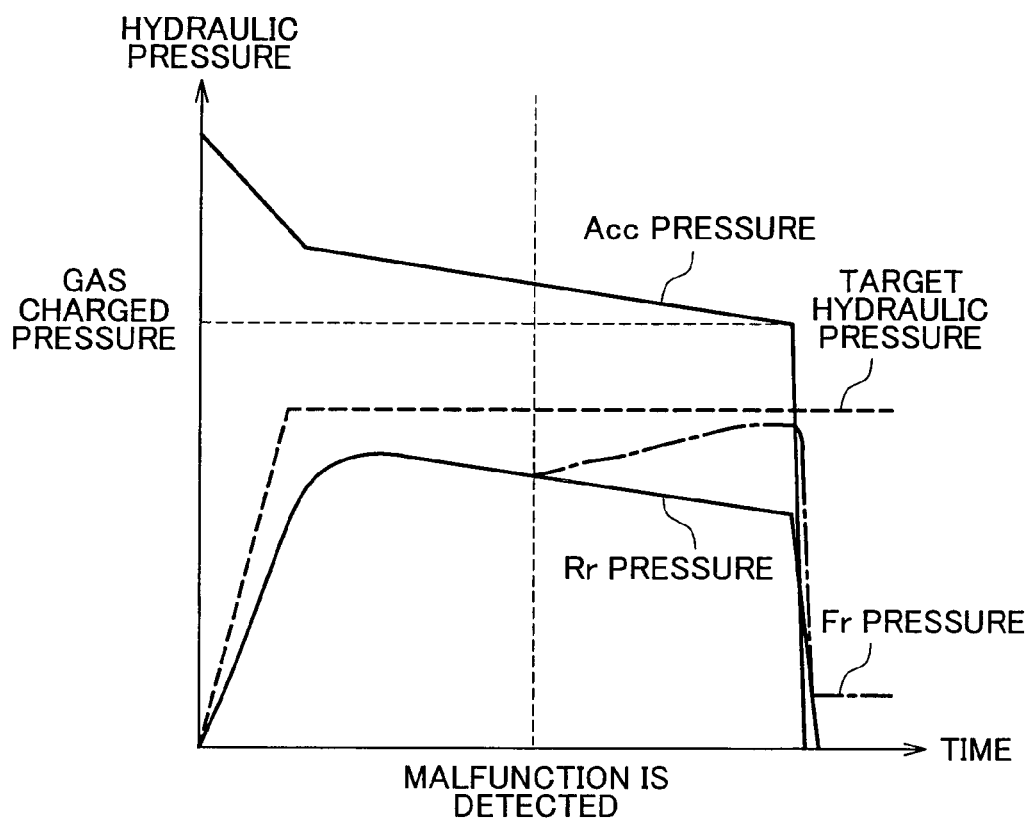
FIG. 3 is a graph illustrating a time-change in the hydraulic pressure, which is caused when a malfunction due to hydraulic fluid leakage occurs in a rear-system.

FIG. 2 is a graph illustrating a time-change in the hydraulic pressure, which is caused when a malfunction due to hydraulic fluid leakage occurs in the front-system. FIG. 3 is a graph illustrating a time-change in the hydraulic pressure, which is caused when a malfunction due to hydraulic fluid leakage occurs in the rear-system. In each of FIGS. 2 and 3, the ordinate axis represents the hydraulic pressure, and the abscissa axis represents the time. Shown in FIG. 2 are time-changes in the accumulator pressure, the front wheel cylinder pressure and the rear wheel cylinder pressure, which are caused when a malfunction due to hydraulic fluid leakage occurs in the front-system after the braking force control is started in the linear control mode and the control mode is changed to the hydro-booster mode when the malfunction is detected. In FIGS. 2 and 3, the accumulator pressure, the front wheel cylinder pressure, and the rear wheel cylinder pressure are denoted by Acc pressure, Fr pressure and Rr pressure, respectively. Also shown in each of FIGS. 2 and 3 is a target hydraulic pressure. During the control executed in the linear control mode prior to detection of a malfunction, the term "target hydraulic pressure" signifies a target hydraulic pressure calculated by the brake ECU 70. During the control executed in the hydro-booster mode after detection of a malfunction, the term "target hydraulic pressure" signifies a hydraulic pressure normally generated in accordance with the depressing force applied to the brake pedal by the driver.

As shown in FIGS. 2 and 3, the target hydraulic pressure starts increasing immediately after the braking operation is started. The wheel cylinder pressures are increased in accordance with an increase in the target hydraulic pressure, whereas the accumulator pressure is consumed and decreased in order to increase the wheel cylinder pressures. The manner in which the wheel cylinder pressures increase do not accurately match the manner in which the target hydraulic pressure increases, because it is assumed herein that a malfunction due to hydraulic fluid leakage occurs after the braking operation is started. If a predetermined malfunction determination condition is satisfied, for example, if the deviation of the wheel cylinder pressure from the target hydraulic pressure exceeds a threshold value, the brake ECU 70 determines that there is an anomaly in response of the hydraulic pressure to the control, and changes the control mode from the linear control mode to the hydro-booster mode that is used as the backup control mode for the linear control mode.

Because the path, through which the brake fluid is supplied from the hydraulic pressure source to the wheel cylinders 23, is divided into the front-system and the rear-system after the control mode is changed to the hydro-booster mode, the Fr pressure and the Rr pressure change in different manners. As shown in FIG. 2, if leakage has occurred in the front-system, the Rr pressure approaches the target hydraulic pressure as in a normal case by separating the rear-system from the front-system. On the other hand, the Fr pressure is gradually decreased under the influence of the leakage in the front-system. The flow of the hydraulic fluid between the reservoir 34 and the master cylinder 32, which serves as the hydraulic pressure source for the front-system in the hydro-booster mode, is shut off during the braking operation. Therefore, the Fr pressure becomes zero when the hydraulic fluid completely drains from the master cylinder 32. In this case, a braking force is applied to the vehicle using only the Rr pressure.

Further, the accumulator 35 is not communicated with the master cylinder 32. Therefore, if the rear-system, which is properly operating, is separated from the front-system, the Acc pressure is brought back to a normal hydraulic pressure range by driving the pump 36. Thus, because the accumulator pressure is brought back to a normal level by changing the control mode to the hydro-booster mode, the amplifying function of the hydraulic pressure booster 31, which uses the accumulator pressure, is maintained in the normal state.

However, when a malfunction due to hydraulic fluid leakage occurs in the rear-system, there is a possibility that the function of the hydraulic pressure booster 31 cannot be maintained even if the control mode is changed to the hydro-booster mode. As shown in FIG. 3, if a malfunction due to hydraulic fluid leakage occurs in the rear-system, the Fr pressure approaches the target hydraulic pressure, whereas the Rr pressure approaches the target hydraulic pressure in the case shown in FIG. 2. However, the Rr pressure is gradually decreased under the influence of the malfunction due to hydraulic fluid leakage. In the embodiment of the invention, the Rr pressure is equal to the regulator pressure. Further, the master cylinder unit 27 is configured in such a manner that the regulator pressure is adjusted in accordance with the master cylinder pressure by using the accumulator 35 as a high-pressure source. Therefore, the hydraulic fluid in the accumulator 35 is consumed to increase the Rr pressure and the regulator pressure, which would otherwise continue decreasing due to the malfunction caused by the leakage, in conformity with the master cylinder pressure (i.e., the Fr pressure).

This results in a gradual decrease in the Acc pressure. If a malfunction due to hydraulic fluid leakage occurs in the master cylinder-side system, the amount of leaked hydraulic fluid is limited to that of the hydraulic fluid stored in the master cylinder 32. Therefore, the Acc pressure is not excessively reduced. However, when a malfunction due to hydraulic fluid leakage occurs in the regulator-side system, the hydraulic fluid in the accumulator 35 may continue leaking until the hydraulic fluid completely drains from the accumulator 35.

If the Acc pressure decreases to the same level as the gas charged pressure of the accumulator 35, the Acc pressure rapidly drops to zero. This is because the accumulator 35 is basically not able to store the hydraulic fluid at the hydraulic pressure equal to or lower than the gas charged pressure. If the Acc pressure drops, to zero, the Rr pressure also drops to zero. Further, the amplifying function of the hydraulic pressure booster 31 is no longer available, and the Fr pressure drops to a hydraulic pressure level that is achieved by the depressing force applied to the brake pedal by the driver, that is, the static pressure level.

As described above, if a malfunction due to hydraulic fluid leakage occurs in the regulator-side system during the braking operation performed in the hydro-booster mode, the amplifying function of the hydraulic pressure booster 31 is rapidly lost once the accumulator pressure fall below the gas charged pressure due to leakage of the hydraulic fluid from the accumulator 35. This sharply increases the pedal depressing force that should be applied to the brake pedal by the driver in order to generate the master cylinder pressure that is as high as the master cylinder pressure which is achieved when the hydraulic pressure booster 31 is functioning properly. As this time, a repercussion of the brake pedal, that is, so-called "kickback" occurs, which greatly changes the brake feel.

According to the embodiment of the invention, in order to suppress such a change in the brake feel, the flow of the hydraulic fluid in the regulator-side system is shut off if it is determined that the malfunction is caused by the leakage in the regulator-side system. In other words, the path, through which the hydraulic fluid flows, is controlled in such a manner that the hydraulic fluid does not flow between the regulator 33 and the wheel cylinders 23. If the leakage occurs at a position downstream of the position at which the flow of the hydraulic fluid is shut off, namely, at a position closer to wheel cylinders 23 than to the regulator 33, drainage of the hydraulic fluid from the regulator 33 and the accumulator 35 is prevented. Thus, the hydraulic pressure booster 31 continues functioning properly, which prevents a significant change in the brake feel.

According to the embodiment of the invention, the brake ECU 70 changes the control mode to a brake mode that is used as a backup control mode, when a malfunction is detected in the brake control system. The control mode before being changed is, for example, the linear control mode, the regulator mode, or another control mode. Preferably, the brake mode used as the backup control mode is the above-described hydro-booster mode in which the path, through which the hydraulic fluid is supplied from the hydraulic pressure source to the wheel cylinders, is divided into the master cylinder-side system and the regulator-side system.

After the control mode is changed to the brake mode used as the backup control mode, the brake ECU 70 determines whether the malfunction is caused by leakage of the hydraulic fluid from the regulator-side system. The brake ECU 70 may determine that the malfunction due to hydraulic fluid leakage has occurred in the regulator-side system, if the accumulator pressure continuously decreases in the brake mode used as the backup control mode, for example, as shown in FIG. 3. If it is determined that the malfunction is caused by leakage of the hydraulic fluid from the regulator-side system, the brake ECU 70 shuts off the flow of the hydraulic fluid in the regulator-side system. In the strict sense, it is not possible to stop drainage of the hydraulic fluid from the hydraulic pressure source unless the malfunction due to hydraulic fluid leakage occurs at a position downstream of the position at which the flow of the hydraulic fluid is shut off. However, if priority is given to suppression of an abrupt change in the brake feel, the flow of the hydraulic fluid in the regulator-side system should be shut off rapidly before specifying the exact location of the leakage. To enhance the effect of shutting off the flow of the hydraulic fluid in the regulator-side system, the check valve that is closest to the regulator 33 in the regulator-side system should be closed. According to the embodiment of the invention, the flow of the hydraulic fluid in the regulator-side system is shut off by closing, for example, the regulator cut valve 65.

The brake ECU 70 may shut off the flow of the hydraulic fluid in the regulator-side system if it is determined that a malfunction due to hydraulic fluid leakage has occurred in the regulator-side system and a malfunction due to hydraulic fluid leakage has not occurred in the master cylinder-side system. In other words, the brake ECU 70 may shut off the flow of the hydraulic fluid in the regulator-side system after confirming that a malfunction due to hydraulic fluid leakage has not occurred in the master cylinder-side system. It is desirable to determine whether a malfunction due to hydraulic fluid leakage has occurred in the master cylinder-side system before shutting off the flow of the hydraulic fluid in the regulator-side system. This is because the braking force can be controlled only by the master cylinder-side system when the flow of the hydraulic fluid in the regulator-side system is shutoff.

Figure 4:
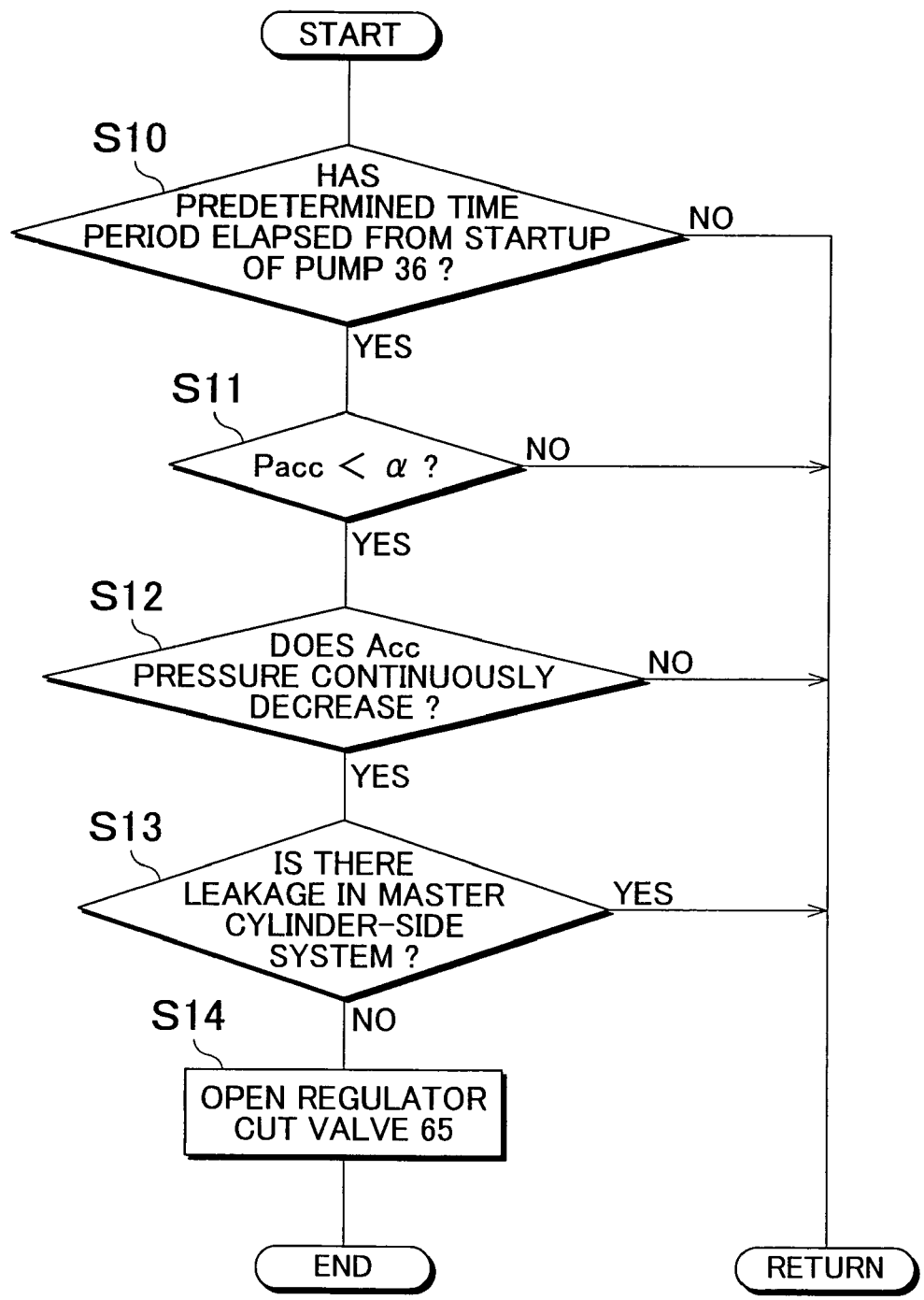
FIG. 4 is a flowchart showing the routine for shutting off the flow of the hydraulic fluid in a regulator-side system according to the embodiment of the invention.

FIG. 4 is a flowchart showing the routine for shutting off the flow of the hydraulic fluid in the regulator-side system according to the embodiment of the invention. The routine shown in FIG. 4 is executed by the brake ECU 70 when the control mode is changed to the hydro-booster mode upon detection of a malfunction.

The brake ECU 70 first determines whether leakage has occurred in the regulator-side system (S10 to S12), and then determines whether leakage has occurred in the master cylinder-side system (S13). If it is determined that leakage has occurred in the regulator-side system but has not occurred in the master cylinder-side system, the brake ECU 70 closes the regulator cut valve 65 to shut off the flow of the hydraulic fluid in the regulator-side system (S14). Whether leakage has occurred in the regulator-side system may be determined basically based on the accumulator pressure. This is because, as shown in FIG. 3, the accumulator pressure continuously decreases if leakage has occurred in the regulator-side system.

When the routine shown in FIG. 4 is started, the brake ECU 70 first determines whether a predetermined time period has elapsed after a startup of the motor 36a of the pump 36 in the power hydraulic pressure source 30 (S10). This determination is made in order to prevent the situation where an instantaneous decrease in the accumulator pressure is erroneously regarded as a continuous decrease. The accumulator pressure is sometimes instantaneously decreased due to an increase in the viscosity of the brake fluid, which is caused, for example, when the temperature of the ambient temperature is extremely low.

If it is determined that the predetermined time period has elapsed after the startup of the motor 36a ("YES" in S10), the brake ECU 70 determines whether the accumulator pressure Pacc is lower than a predetermined threshold value α (S11). The threshold value α is set to a value smaller than a minimum value that the accumulator pressure would take if a malfunction due to hydraulic fluid leakage has occurred in the master cylinder-side system. Thus, if the accumulator pressure is below the threshold value 7α, it is possible to determine that leakage has occurred in the regulator-side system but not in the master cylinder-side system. Preferably, the threshold value α is set to a value equal to or higher than the gas charged pressure of the accumulator 35. This is because, as described above with reference to FIG. 3, if the accumulator pressure is below the gas charged pressure, a braking force is applied using the static pressure.

If it is determined that the accumulator pressure is below the threshold value α ("YES" in S11), the brake ECU 70 determines whether the accumulator pressure Pacc continuously decreases (S12). More specifically, the brake ECU 70 determines whether the accumulator pressure continuously decreases after the control mode is changed to the hydro-booster mode. Executing this determination step makes it possible to more accurately determine whether the malfunction is due to leakage caused in the regulator-side system. This determination may be made based on, for example, the accumulator pressure detected after an anomaly in response of the hydraulic pressure to the control is detected. For example, if it is determined that the accumulator pressure is monotonously decreased, by performing an appropriate filtering process on the accumulator pressure detected within a predetermined time period after the detection of an anomaly in the response of the hydraulic pressure to the control, it is determined that the accumulator pressure is continuously decreased.

If it is determined that the accumulator pressure is continuously decreased ("YES" in S12), it may be considered that a malfunction due to hydraulic fluid leakage has occurred in the regulator-side system. In this case, the brake ECU 70 may immediately close the regulator cut valve 65 to shut off the flow of the hydraulic fluid in the regulator-side system. However, according to the embodiment of the invention, the flow of the hydraulic fluid in the regulator-side system is shut off after it is confirmed that a malfunction due to hydraulic fluid leakage has not occurred in the master cylinder-side system.

More specifically, if it is determined that the accumulator pressure is continuously decreased ("YES" in S12), the brake ECU 70 determines whether leakage has occurred in the master cylinder-side system (S13). This determination may be made by, for example, comparing the difference between the Rr pressure and the Fr pressure with a threshold value. In the hydro-booster mode, the Rr pressure is determined based on the value Preg detected by the regulator pressure sensor 71, and the Fr pressure is determined based on the value Pfr detected by the control pressure sensor 73. Therefore, if the difference between the regulator pressure and the control hydraulic pressure, i.e., the value of Preg−Pfr, exceeds a predetermined threshold value β (β>0), it may be determined that a malfunction due to hydraulic fluid leakage has occurred in the master cylinder-side system. This is because, if leakage occurs in the master cylinder-side system, the Fr pressure decreases over time as shown in FIG. 2, and accordingly the value of Preg−Pfr increases. In this manner, whether a malfunction due to hydraulic fluid leakage has occurred in the master cylinder-side system may be determined based on the Rr pressure and the Fr pressure.

If it is determined that a malfunction due to hydraulic fluid leakage has not occurred in the master cylinder-side system ("NO" in S13), the brake ECU 70 closes the regulator cut valve 65 to shut off the flow of the hydraulic fluid in the regulator-side system (S14). In this case, the brake ECU 70 may store the information that malfunction due to hydraulic fluid leakage has occurred in the regulator-side system by setting a flag indicating occurrence of a malfunction due to hydraulic fluid leakage. Thus, the routine shown in FIG. 4 ends. The brake ECU 70 maintains the regulator-side system in the shut-off state until the brake pedal is released by the driver, i.e., until the braking operation ends.

In the routine shown in FIG. 4, if it is determined that a malfunction due to hydraulic fluid leakage has not occurred in the regulator-side system, or if it is determined that leakage has occurred in the master cylinder-side system ("YES" in S13), the brake ECU 70 terminates the routine, and executes the routine again at the next execution timing. In the embodiment of the invention, examples of the case where it is determined that a malfunction due to hydraulic fluid leakage has not occurred in the regulator-side system include: a case where it is determined that the predetermined time period has not elapsed after a startup of the motor 36a ("NO" in S10); a case where it is determined that the accumulator pressure has exceeded the threshold value α ("NO" in S11); and a case where it is determined that a decrease in the accumulator pressure is not continuous ("NO" in S12).

If it is determined that a malfunction due to hydraulic fluid leakage has occurred in the regulator-side system, the brake ECU 70 may shut off the flow of the hydraulic fluid in the regulator-side system in subsequent braking operations. In this way, the accumulator pressure is accumulated up to a certain level while the braking operation is not performed, whereby it is possible to prevent an abrupt change in the brake feel in subsequent braking operations.

Figure 5:
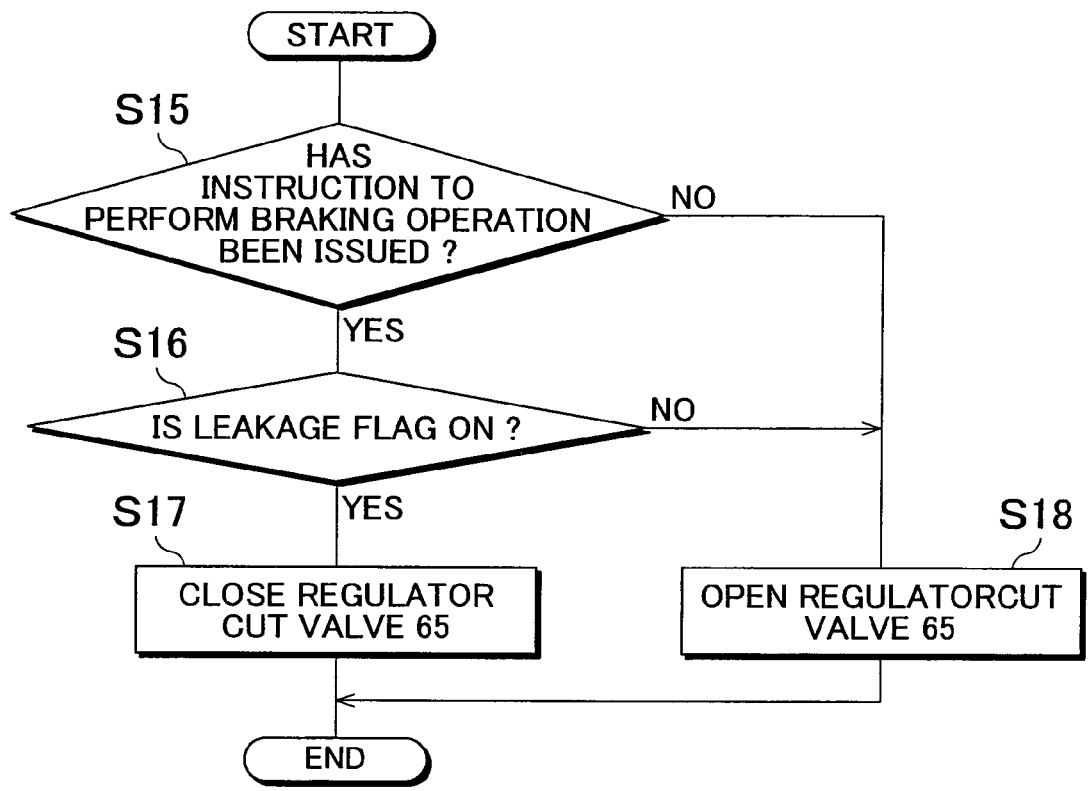
FIG. 5 is a flowchart showing the routine which is executed during the subsequent braking operations performed after it is determined that a malfunction due to hydraulic fluid leakage has occurred in the regulator-side system.

FIG. 5 is a flowchart showing the routine which is executed during the subsequent braking operations performed after it is determined that a malfunction due to hydraulic fluid leakage has occurred in the regulator-side system. The routine shown in FIG. 5 is executed when the subsequent braking operations are performed in the hydro-booster mode after it is determined that a malfunction due to hydraulic fluid leakage has occurred.

First, the brake ECU 70 determines whether an instruction to perform the braking operation has been issued (S15). If it is determined that an instruction to perform the braking operation has not been issued ("NO" in S15), the brake ECU 70 does not control the regulator cut valve 65, and leaves the regulator cut valve 65 open as in the initial state (S18). In contrast, if it is determined that an instruction to perform the braking operation has been issued ("YES" in S15), the brake ECU 70 determines whether the leakage determination flag is on (S16). The leakage determination flag is a flag that indicates occurrence of a malfunction due to hydraulic fluid leakage in the regulator-side system. The leakage determination flag may be a flag that indicates occurrence of a malfunction due to hydraulic fluid leakage at a position downstream of the regulator cut valve 65. An example of a method for determining whether a malfunction due to hydraulic fluid leakage has occurred at a position downstream of the regulator cut valve 65 will be described later with reference to FIGS. 6 and 7.

If it is determined that the leakage determination flag is off ("NO" in S16), the brake ECU 70 does not control the regulator cut valve 65, and leaves the regulator cut valve 65 open as in the initial state (S18). On the other hand, if it is determined that the leakage determination flag is on ("YES" in S16), the brake ECU 70 closes the regulator cut valve 65 (S17). In this way, if it is determined that a malfunction due to hydraulic fluid leakage has occurred in the regulator-side system, the regulator cut valve 65 may be kept closed in the subsequent braking operations, whereby an abrupt change in braking feel is suppressed.

Next, modified examples of the embodiment of the invention will be described. Unlike the foregoing embodiment, the brake ECU 70 may stop shutting off the flow of the hydraulic fluid in the regulator-side system before the braking operation ends depending on the situation. In the brake mode used as the backup control mode, the flow of the hydraulic fluid is basically permitted the regulator-side system. Therefore, the flow of the hydraulic fluid may be shut off only when shutting of the flow of the hydraulic fluid produces an effect.

For example, shutting off of the flow of the hydraulic fluid in the regulator-side system may be cancelled, if it is determined that a malfunction due to hydraulic fluid leakage occurs at a position closer to the regulator 33 than the position at which the flow of the hydraulic fluid in the regulator-side system is shut off is. By determining, for example, whether the hydraulic pressure in the power hydraulic pressure source 30 is in the process of recovery after the flow of the hydraulic fluid the regulator-side system is shut off, it is possible to determine whether the malfunction due to hydraulic fluid leakage has occurred at a position upstream (on the regulator side) or at a position downstream (on the wheel cylinder side) of the position at which the flow of the hydraulic fluid is shut off. The determination is made based on the following facts: if leakage has occurred at a position upstream of the position at which the flow of the hydraulic fluid is shut off, the hydraulic pressure in the power hydraulic pressure source 30 continuously decreases; whereas, if leakage has occurred at a position downstream of the position at which the flow of the hydraulic fluid is shut off, the hydraulic pressure in the power hydraulic pressure source 30 starts increasing because the position at which leakage has occurred is isolated from the path through which the hydraulic fluid flows.

Figure 6:
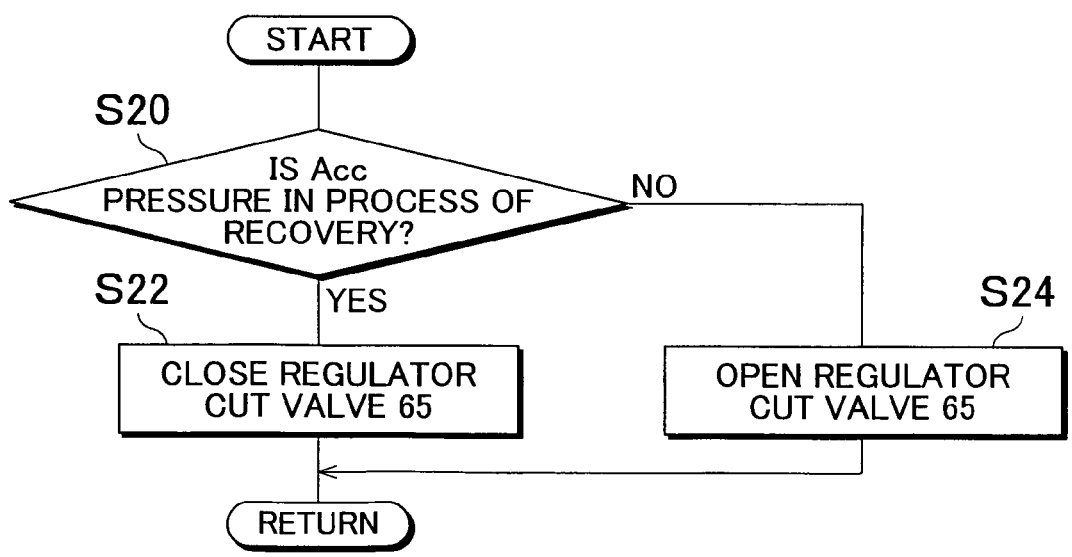
FIG. 6 is a flowchart showing the routine according to a first modified example of the embodiment of the invention.

FIG. 6 is a flowchart showing the routine according to a first modified example of the embodiment of the invention. This routine is additionally executed after the flow of the hydraulic fluid in the regulator-side system is shut off. This routine is executed after the regulator cut valve 65 is closed (S14) in the routine shown in FIG. 4. In order to more accurately determine whether the hydraulic pressure in the power hydraulic pressure source 30 is in the process of recovery, preferably, the following routine is executed after a lapse of a predetermined standby time required for the hydraulic pressure in the power hydraulic pressure source 30 to be in the process of recovery.

As shown in FIG. 6, the brake ECU 70 first determines whether the accumulator pressure is in the process of recovery (S20). This determination may be made based on, for example, the accumulator pressure detected after the regulator cut valve 65 is closed. For example, if it is determined that the accumulator pressure is increasing, by performing an appropriate filtering process on the accumulator pressure detected within a predetermined time period after the regulator cut valve 65 is closed, it is determined that the accumulator pressure is in the process of recovery.

If it is determined that the accumulator pressure is in the process of recovery ("YES" in S20), the brake ECU 70 keeps the regulator cut valve 65 closed (S22). In this case, the brake ECU 70 maintains the regulator-side system in the shut-off state until the brake pedal is released by the driver, i.e., until the braking operation ends. Because the accumulator pressure is recovered by closing the regulator cut valve 65, it may be determined that the leakage has occurred at a position downstream of the regulator cut valve 65. At this time, the braking forces applied to the rear wheels are gradually decreased due to the leakage of the hydraulic fluid, but the function of the hydraulic pressure booster 31 may be maintained. Therefore, the hydraulic pressure amplified by the hydraulic pressure booster 31 is reliably used as the Fr pressure. Thus, the vehicle is braked by a braking force applied to the front wheels.

On the other hand, if it is determined that the accumulator pressure is not in the process of recovery ("NO" in S20), the brake ECU 70 opens the regulator cut valve 65 (S24). If the accumulator pressure is not brought into the process of recovery even after the regulator cut valve 65 is closed, it may be determined that the leakage has occurred at a position upstream of the regulator cut valve 65. Alternatively, there is a possibility that a mechanical malfunction has occurred in the power hydraulic pressure source 30, for example, in the accumulator 35 or the pump 36. In any of these cases, if the accumulator pressure is not brought into the process of recovery even after the regulator cut valve 65 is closed, the regulator cut valve 65 may be left open. Because the regulator cut valve 65 is a normally-open electromagnetically-controlled valve, the electric power consumption may be reduced by keeping the regulator cut valve 65 open. Then, the routine shown in FIG. 6 ends.

Hereinafter, a second modified example of the embodiment of the invention will be described. If the accumulator pressure is not brought into the process of recovery even after the regulator cut valve 65 is closed as in the first modified example described above, it may be determined that leakage of hydraulic fluid has occurred at a position upstream of the regulator cut valve 65. Because occurrence of malfunctions at two or more positions at the same time is very rare, it is considered that the possibility that leakage has occurred at a position downstream of the regulator cut valve 65 is considerably low. Therefore, the Rr pressure is maintained at the hydraulic pressure, which is achieved when the regulator cut valve 65 is closed, by closing the regulator cut valve 65 (S14 in FIG. 4). In this case, the accumulator pressure is gradually decreased. Therefore, the function of the hydraulic is eventually stopped so that the Fr pressure drops to the static pressure level as shown in FIG. 3. Therefore, the Rr pressure, which is maintained at the above-described level, should be used to apply a braking force to the vehicle.

Therefore, in the second modified example of the embodiment of the invention, if it is determined that the position, at which a malfunction due to hydraulic fluid leakage, is closer to the regulator than the position, at which the flow of the hydraulic fluid in the regulator-side system is shut off, is, the brake ECU 70 keeps or cancels the shut off state of the regulator-side system depending on the regulator pressure. For example, if the regulator pressure is higher than the hydraulic pressure in the wheel cylinders in the regulator-side system, the shut off state of the regulator-side system may be canceled to increase the hydraulic pressure in these wheel cylinders. For example, if the brake pedal 24 is further depressed by the driver, the regulator pressure may be increased to a high pressure temporarily. In this manner, the hydraulic pressure in the wheel cylinders in the regulator-side system can be effectively used to apply a braking force to the vehicle.

FIG. 7 is a flowchart showing the routine according to a second modified example of the embodiment of the invention. As in the first modified example described above, this routine is additionally executed after the flow of the hydraulic fluid in the regulator-side system is shut off. Note that, descriptions on the same parts as those in the first modified example will be not be provided below.

As shown in FIG. 7, if it is determined that the accumulator pressure is not in the process of recovery ("NO" in S20), the brake ECU 70 compares the Rr pressure maintained (hereinafter, referred to as "maintained Rr pressure") with the regulator pressure Preg (S26). The value, which is detected by the control pressure sensor 73 or the regulator pressure sensor 71 when the regulator cut valve 65 is closed, is stored in the brake ECU 70 as the maintained Rr pressure. If it is determined that the maintained Rr pressure is equal to or lower than the regulator pressure ("YES" in S26), the brake ECU 70 keeps the regulator cut valve 65 closed (S22). This is because, if the regulator cut valve 65 is opened, the maintained Rr pressure will drop in accordance with the regulator pressure.

On the other hand, if it is determined that the regulator pressure is higher than the maintained Rr pressure ("NO" in S26), the brake ECU 70 opens the regulator cut valve 65 (S28). By opening the regulator cut valve 65, the regulator pressure, which is kept higher than the maintained Rr pressure, is introduced into the wheel cylinders to thereby increase the Rr pressure. The brake ECU 70 then detects the regulator pressure and stores the detected regulator pressure Preg as an updated maintained Rr pressure (S30). In this manner, the routine shown in FIG. 7 is terminated, and then will be periodically executed.

If the regulator cut valve 65 is required to be opened in a routine, which is given higher priority than the above-described routine, while the regulator cut valve 65 is closed, the regulator cut valve 65 may be opened. Examples of a process that is given higher priority than the above-described routine include the ABS control over the rear wheels.

According to the embodiment of the invention described above, the flow of the hydraulic fluid in the regulator-side system is shut off if a malfunction due to hydraulic fluid leakage is detected in the regulator-side system. This makes it possible to prevent drainage of the hydraulic fluid from the hydraulic pressure source. Thus, it is possible to continue the operation of the hydraulic pressure booster mechanism. As a result, it is possible to prevent an abrupt change in the brake feel even if a malfunction occurs.

According to the embodiment of the invention, only one pressure-decreasing linear control valve 67 is provided in the regulator-side system to reduce the cost. By increasing the number of the control valves, the likelihood that a malfunction due to hydraulic fluid leakage may occur in the brake control system is expected to increase. However, according to the embodiment of the invention described above, effective measures are taken to suppress changes in the brake feel and to ensure sufficient braking force if a malfunction due to hydraulic fluid leakage occurs in the regulator-side system. This makes it possible to enhance the failsafe properties while saving the cost.

The brake control apparatus 20 according to the embodiment of the invention employs a so-called front rear piping structure. That is, the wheel cylinders 23FR and 23FL of the front wheels are supplied with the hydraulic fluid by the master cylinder-side system, whereas the wheel cylinders 23RR and 23RL of the rear wheels are supplied with the hydraulic fluid by the regulator-side system. Unlike a so-called X-piping structure in which the wheel cylinders of the right wheels and the wheel cylinders of the left wheels are connected to different systems, in the front rear piping structure, even when the flow of the hydraulic fluid in the regulator-side system is shut off, only a small influence is exerted on the balance between the braking force applied to the right wheels and the braking force applied to the left wheels.

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

What is claimed is:

1. A brake control apparatus, comprising:
   multiple wheel cylinders that apply braking forces to respective wheels in accordance with hydraulic fluid pressures;
   a wheel cylinder pressure control system that controls the hydraulic fluid pressures in the multiple wheel cylinders by using a power hydraulic pressure source that pressurizes hydraulic fluid using power;
   a manual hydraulic pressure source that includes a master cylinder which pressurizes hydraulic fluid stored in the master cylinder in accordance with a brake operation input, and a regulator which regulates hydraulic fluid pressure in accordance with hydraulic fluid pressure in the master cylinder by using the power hydraulic pressure source as a high-pressure source;
   a hydraulic pressure booster mechanism that amplifies the brake operation input by using the hydraulic fluid pressure in the regulator, and outputs the amplified brake operation input to the master cylinder;
   a hydraulic fluid supply path that connects the manual hydraulic pressure source to the multiple wheel cylinders, wherein, in a brake mode which is used as a backup control mode, the hydraulic fluid supply path is divided into a master cylinder-side system, through which the hydraulic fluid is supplied from the master cylinder to at least one of the wheel cylinders, and a regulator-side system, through which the hydraulic fluid is supplied from the regulator to the other of the wheel cylinders; and
   a controller that terminates a control executed by the wheel cylinder pressure control system and changes a control mode to the brake mode used as the backup control mode when a malfunction is detected, and that shuts off a flow of the hydraulic fluid in the regulator-side system when it is determined that the malfunction is a malfunction due to hydraulic fluid leakage caused in the regulator-side system.

2. The brake control apparatus according to claim 1, wherein the controller determines that the malfunction is a malfunction due to hydraulic fluid leakage caused in the regulator-side system, if hydraulic pressure in the power hydraulic pressure source continuously decreases even after the control mode is changed to the brake mode used as the backup control mode.

3. The brake control apparatus according to claim 2, wherein the controller shuts off the flow of the hydraulic fluid in the regulator-side system, if it is determined that a malfunction due to hydraulic fluid leakage has occurred in the regulator-side system and a malfunction due to hydraulic fluid leakage has not occurred in the master cylinder-side system.

4. The brake control apparatus according to claim 3, wherein the controller determines that a malfunction due to hydraulic fluid leakage has occurred in the master cylinder-side system, if a difference between the hydraulic fluid pressure in the regulator and a control hydraulic pressure exceeds a predetermined threshold value.

5. The brake control apparatus according to claim 1, wherein the controller shuts off the flow of the hydraulic fluid in the regulator-side system, if it is determined that a malfunction due to hydraulic fluid leakage has occurred in the regulator-side system and a malfunction due to hydraulic fluid leakage has not occurred in the master cylinder-side system.

6. The brake control apparatus according to claim 5, wherein the controller determines that a malfunction due to hydraulic fluid leakage has occurred in the master cylinder-side system, if a difference between the hydraulic fluid pressure in the regulator and a control hydraulic pressure exceeds a predetermined threshold value.

7. The brake control apparatus according to claim 1, wherein:
the controller continues shutting off the flow of the hydraulic fluid in the regulator-side system, if a position, at which the malfunction due to hydraulic fluid leakage has occurred, is closer to the wheel cylinders than a position, at which the flow of the hydraulic fluid in the regulator-side system is shut off; and
the controller cancels shutting-off of the flow of the hydraulic fluid in the regulator-side system, if the position, at which the malfunction due to hydraulic fluid leakage has occurred, is closer to the regulator than the position, at which the flow of the hydraulic fluid in the regulator-side system is shut off.

8. The brake control apparatus according to claim 7, wherein the controller determines whether the hydraulic fluid pressure in the power hydraulic pressure source is in a process of recovery after the flow of the hydraulic fluid in the regulator-side system is shut off in order to determine whether the position, at which the malfunction due to hydraulic fluid leakage has occurred, is closer to the wheel cylinders than the position, at which the flow of the hydraulic fluid in the regulator-side system is shut off, is, or the position, at which the malfunction due to hydraulic fluid leakage has occurred, is closer to the regulator than the position, at which the flow of the hydraulic fluid in the regulator-side system is shut off.

9. The brake control apparatus according to claim 1, wherein, if the position, at which the malfunction due to hydraulic fluid leakage has occurred, is closer to the regulator than the position, at which the flow of the hydraulic fluid in the regulator-side system is shut off, the controller controls the flow of the hydraulic fluid in the regulator-side system based on a magnitude relationship between the hydraulic fluid pressure in the wheel cylinders connected to the regulator-side system and the hydraulic pressure in the regulator.

10. The brake control apparatus according to claim 9, wherein the controller determines whether the hydraulic fluid pressure in the power hydraulic pressure source is in a process of recovery after the flow of the hydraulic fluid in the regulator-side system is shut off in order to determine whether the position, at which the malfunction due to hydraulic fluid leakage has occurred, is closer to the wheel cylinders than the position, at which the flow of the hydraulic fluid in the regulator-side system is shut off, or the position, at which the malfunction due to hydraulic fluid leakage has occurred, is closer to the regulator than the position, at which the flow of the hydraulic fluid in the regulator-side system is shut off.

11. A brake control method for controlling a brake control apparatus including:
multiple wheel cylinders that apply braking forces to respective wheels in accordance with hydraulic fluid pressures;
a wheel cylinder pressure control system that controls the hydraulic fluid pressures in the multiple wheel cylinders by using a power hydraulic pressure source that pressurizes hydraulic fluid using power supplied to the power hydraulic pressure source;
a manual hydraulic pressure source that includes a master cylinder which pressurizes hydraulic fluid stored in the master cylinder in accordance with a brake operation input, and a regulator which regulates hydraulic fluid pressure in accordance with hydraulic fluid pressure in the master cylinder by using the power hydraulic pressure source as a high-pressure source;
a hydraulic pressure booster mechanism that amplifies the brake operation input by using the hydraulic fluid pressure in the regulator, and outputs the amplified brake operation input to the master cylinder; and
a hydraulic fluid supply path that connects the manual hydraulic pressure source to the multiple wheel cylinders, wherein, in a brake mode which is used as a backup control mode, the hydraulic fluid supply path is divided into a master cylinder-side system, through which the hydraulic fluid is supplied from the master cylinder to at least one of the wheel cylinders, and a regulator-side system, through which the hydraulic fluid is supplied from the regulator to the other of the wheel cylinders,
the brake control method comprising:
terminating a control executed by the wheel cylinder pressure control system and changes a control mode to the brake mode used as the backup control mode when a malfunction is detected; and
shutting off a flow of the hydraulic fluid in the regulator-side system when it is determined that the malfunction is a malfunction due to hydraulic fluid leakage caused in the regulator-side system.

\* \* \* \* \*